(12) United States Patent
Johnson et al.

(10) Patent No.: US 9,969,304 B2
(45) Date of Patent: May 15, 2018

(54) CHILD SEAT MODULE FOR A VEHICLE

(71) Applicant: VOLVO CAR CORPORATION, Gothenburg (SE)

(72) Inventors: Tisha Johnson, Camarillo, CA (US); Todd Levy, Gothenburg (SE); Patrik Lundgren, Torslanda (SE); Axel Ernstsson, Gothenburg (SE); Thomas Christiansson, Askim (SE); Robin Page, Vastra Frolunda (SE)

( * ) Notice: Subject to any disclaimer, the term of this patent is extended or adjusted under 35 U.S.C. 154(b) by 0 days. days.

(21) Appl. No.: 15/088,458

(22) Filed: Apr. 1, 2016

(65) Prior Publication Data

US 2016/0288670 A1 Oct. 6, 2016

(30) Foreign Application Priority Data

Apr. 1, 2015 (EP) .................................... 15162223

(51) Int. Cl.
*B60N 2/26* (2006.01)
*B60N 2/28* (2006.01)
(Continued)

(52) U.S. Cl.
CPC .......... *B60N 2/26* (2013.01); *B60N 2/01508* (2013.01); *B60N 2/06* (2013.01); *B60N 2/28* (2013.01);
(Continued)

(58) Field of Classification Search
CPC . B60N 2/005; B60N 2/26; B60N 2/28; B60N 2/2821; B60N 2/2824; B60N 2/2827; B60N 2/2869; B60N 2/2875
(Continued)

(56) References Cited

U.S. PATENT DOCUMENTS 5,443,239 A   8/1995 Laporte
6,264,261 B1 * 7/2001 Krafcik ................ B60N 2/2839
                                              296/37.8
(Continued)

FOREIGN PATENT DOCUMENTS

DE   19949933 C1 * 2/2001 ............... B60N 2/06
EP   0622266 A1   11/1994
(Continued)

OTHER PUBLICATIONS

English translation of DE 199 49 933; retreived May 18, 2017 via PatentTranslate located at www.epo.org.*
(Continued)

*Primary Examiner* — Jason S Daniels
(74) *Attorney, Agent, or Firm* — Brooks Kushman P.C.

(57) ABSTRACT

A child seat module for arrangement in a passenger compartment of a vehicle comprises a base arranged to be releasably connected to seat rails of the passenger compartment, and arranged to be movable along the seat rails; and a child seat comprising a seat. The child seat is arranged on top of the base and is rotatable around an axis of rotation with respect to the base between a riding position and a loading position. The seat of the child seat faces rearwards towards the back of the passenger compartment when the child seat is in the riding position, and the child seat is rotated between 80-100 degrees with respect to the base such that the seat of the child seat faces towards a side opening of the passenger compartment when the child seat is in the loading position, when the module is arranged in the vehicle.

22 Claims, 11 Drawing Sheets

(51) Int. Cl.
*B60N 2/015* (2006.01)
*B60N 2/06* (2006.01)

(52) U.S. Cl.
CPC ......... *B60N 2/2824* (2013.01); *B60N 2/2845* (2013.01); *B60N 2/2863* (2013.01); *B60N 2/2869* (2013.01); *B60N 2/2875* (2013.01)

(58) Field of Classification Search
USPC ..... 296/64, 65.01, 65.03; 297/250.1, 256.12, 297/256.16
See application file for complete search history.

(56) References Cited

U.S. PATENT DOCUMENTS

| | | | | |
|---|---|---|---|---|
| 7,073,859 | B1* | 7/2006 | Wilson | B60N 2/0232 297/250.1 |
| 8,702,169 | B2* | 4/2014 | Abadilla | B60N 2/062 297/256.12 |
| 2008/0164712 | A1* | 7/2008 | Burkey | B60N 2/206 296/65.09 |

FOREIGN PATENT DOCUMENTS

| | | |
|---|---|---|
| EP | 2028035 A1 | 2/2009 |
| EP | 2308715 A1 | 4/2011 |
| FR | 2956078 A1 | 8/2011 |

OTHER PUBLICATIONS

Extended European Search Report dated Sep. 23, 2015, Application No. 15162223.0-1754, Applicant Volvo Car Corporation, 4 Pages.
European Office Action dated Mar. 8, 2018, Application No. 15 162 223.0-1010, Applicant Volvo Car Corporation, 5 Pages.

* cited by examiner

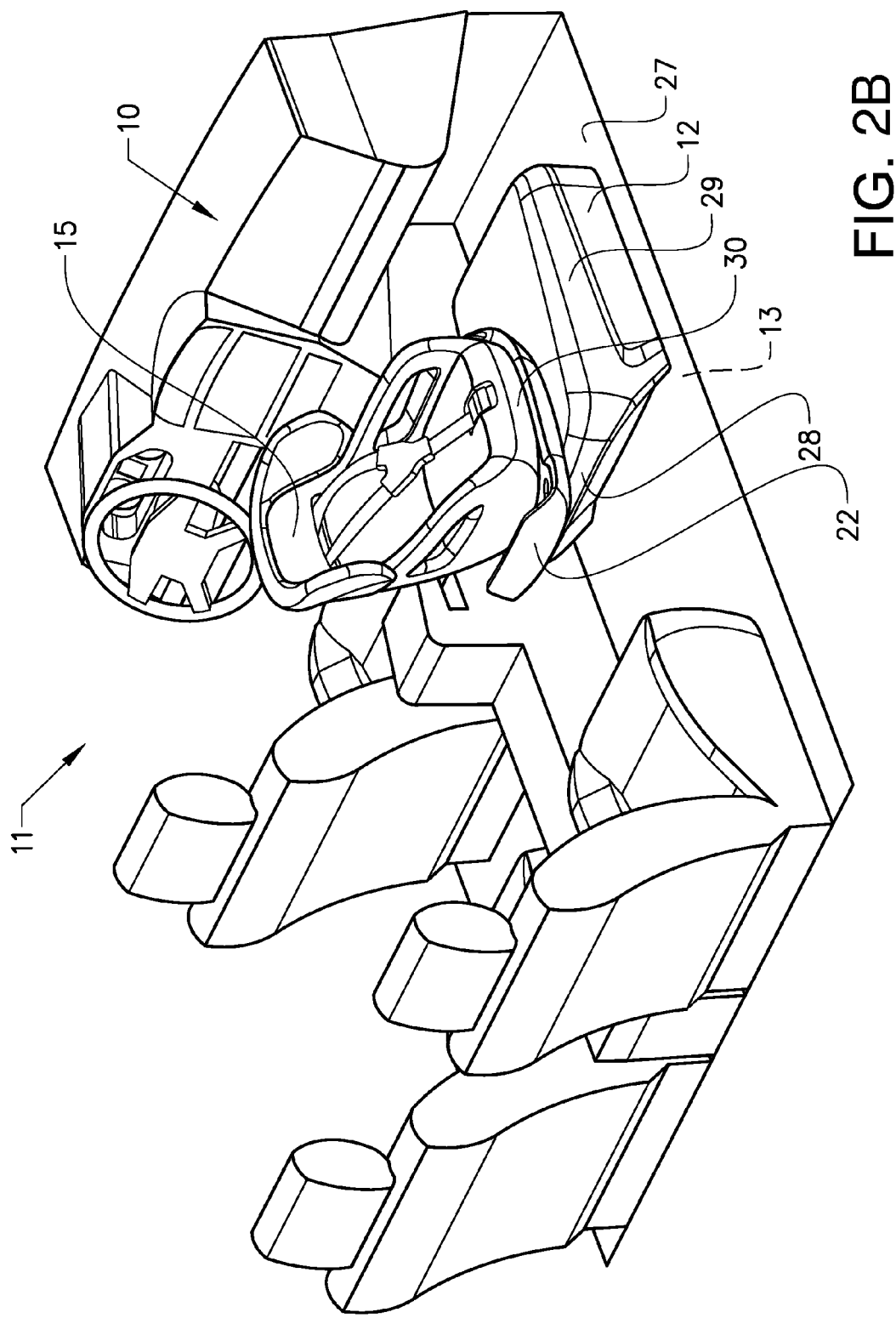

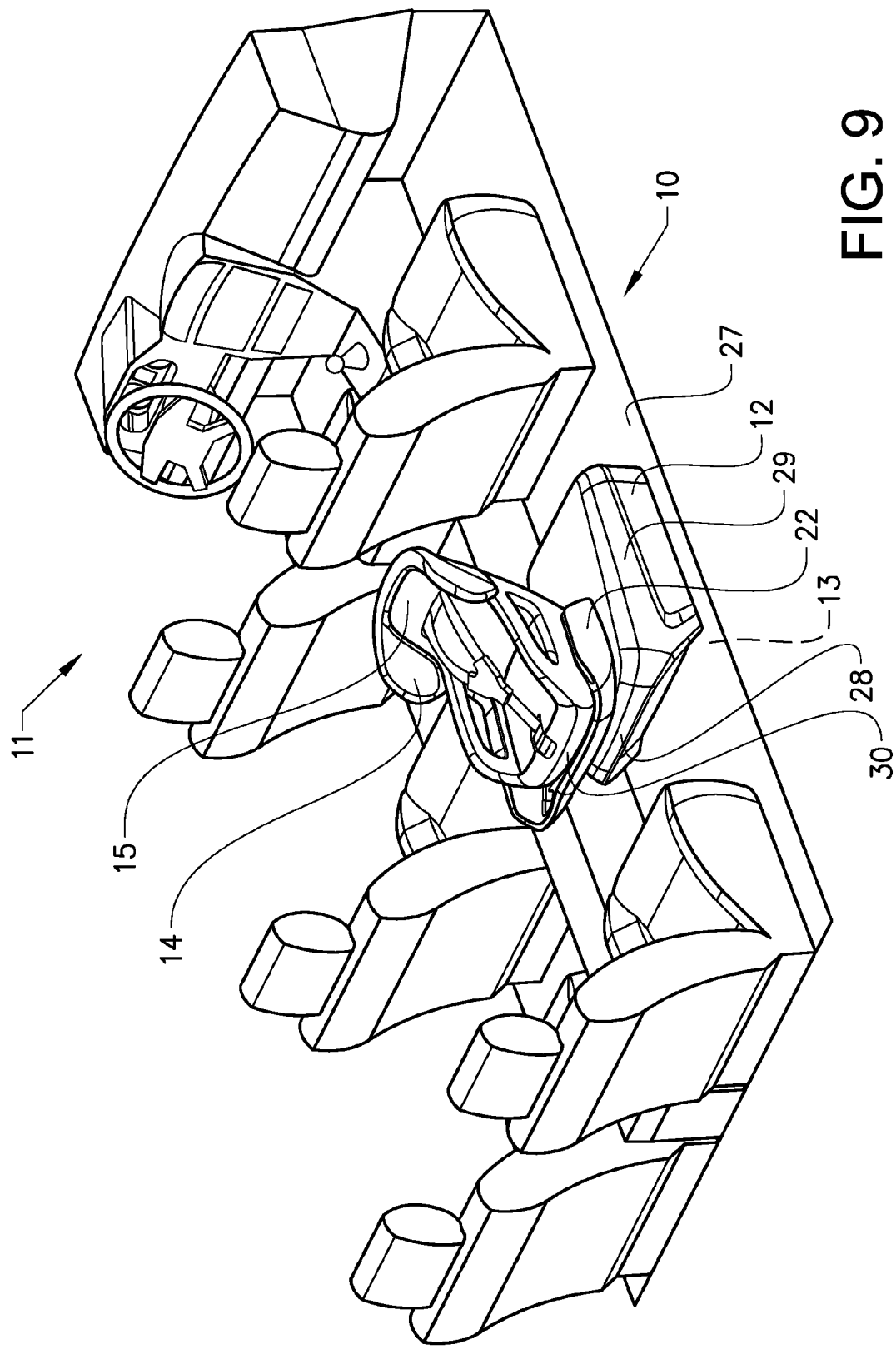

CHILD SEAT MODULE FOR A VEHICLE

CROSS-REFERENCE TO RELATED APPLICATIONS

This application claims foreign priority benefits under 35 U.S.C. § 119(a)-(d) to European patent application number EP 15162223.0, filed Apr. 1, 2015, which is incorporated by reference in its entirety.

TECHNICAL FIELD

The present disclosure concerns a child seat module for arrangement in a passenger compartment of a vehicle, the module comprising a base arranged to be releasably connected to seat rails of the passenger compartment, and arranged to be movable along the seat rails, and a child seat comprising a seat, the child seat being arranged on top of the base and wherein the child seat is rotatable around an axis of rotation with respect to the base between a riding position and a loading position. The disclosure further concerns a vehicle comprising the mentioned child seat module.

BACKGROUND

Child seats for vehicles are seats designed specifically to protect children from injury during collisions in traffic. Automobile manufacturers may integrate child safety seats directly into their vehicle's design or, most commonly; these seats are purchased and installed by consumers.

The most common child seats are installed in the passenger seat besides the driver, with the air bag being disconnected. The child seat modules for small children are often installed such that the child is facing rearwards such as to face the backrest of the passenger seat in which it is installed.

When loading or unloading the child/baby in the child seat the grown-up must reach in between the child seat and the backrest of the passenger seat where space is often limited.

Child seats are used for young children, and are in some countries a requirement for children up to the age of two. For older children "booster seats," are often used until the child is large enough to use an adult seat belt.

SUMMARY

In the common child seats described in the background it may be perceived as cumbersome to place the child in the child seat and buckle up the child due to the limited space. In addition; interaction between the baby and passengers in the back seat is limited since the backrest of the seat at which the child seat is arranged is restricting the visual contact between the two. It is also difficult to reach the child/baby from the passenger seat in the row behind since the back rest of the passenger seat at which the child seat is placed is in the way.

Moreover, the passenger seat and the child seat arranged upon it are taking up space in the passenger compartment that cannot be used for something else.

There is thus a need for an improved child seat module. The child seat module disclosed hereafter alleviates the abovementioned and other issues with existing child seat modules. The object of the child seat module disclosed is to provide better access to the seat of the child seat during loading, unloading as well as during riding and to make better use of the space in the passenger compartment. The child seat module disclosed hereafter provides improved loading/unloading, improved interaction possibilities and increased comfort for the child and the accompanying passenger.

The disclosure describes a child seat module for arrangement in a passenger compartment of a vehicle, the module comprising a base arranged to be releasably connected to seat rails of the passenger compartment and arranged to be movable along the seat rails; and a child seat comprising a seat, the child seat being arranged on top of the base and wherein the child seat is rotatable around an axis of rotation with respect to the base between a riding position and a loading position.

The child seat is movable along at least part of the extension of the seat rails. The base may further comprise engagement means for engagement with the seat rails and arranged to allow movement of the module along the seat rails. Suitable engagement means are for example the engagement means type that are used to engage a passenger seat to the seat rails. Such engagement means are commonly known in the art.

The seat of the child seat is facing rearwards towards the back of the passenger compartment when the child seat is in said riding position, and the child seat is rotated between 80-100 degrees with respect to the base such that the seat of the child seat is facing towards a side opening of said passenger compartment when the child seat is in said loading position, when the module is arranged in the vehicle.

The main extension of the base is arranged to correspond to the direction of the extension of the seat rails. The child seat is thus rotated with respect to the extension of the seat rails when moving between the riding position and the loading position, when the child seat module is installed in a vehicle.

In some aspects of the disclosure the child seat module is provided with a safety system preventing the child seat from rotation with respect to the base if the engine is on and/or the vehicle is in motion. The safety system may comprise an engine kill switch automatically turning the engine off if the child seat module is rotated from the riding position towards the loading position when the engine is running and/or when the vehicle is moving. The switch may also prevent accidentally turning on the engine when the child seat is in the loading position to prevent the vehicle from being operated while the child is being loaded. The safety system may also comprise the vehicle brake automatically engaging when the child seat module is rotated with respect to the base.

The passenger seat, if such is installed at the seat rails, is released from the seat rails and removed from the passenger compartment before the seat child module is arranged in the passenger compartment by connecting the base to the seat rails. The base of the child seat module is releasably connected to the seat rails such as to allow removal and installation, and to also allow installation of the passenger seat at the same seat rails when the child seat module has been removed. The child seat module thus allows for replacement of the passenger seat. The child seat module can be arranged in any seat row, for example the front row, or the second row if the vehicle comprises three or more rows. It is the intention of the child seat module according to the disclosure herein that the seat of the child seat is facing a rear passenger seat when in riding position. By removing a passenger seat and replacing it with the child seat module a spacious environment is created for the passenger sitting rearwards of the child seat module.

According to the disclosure the seat of the child seat is facing the passenger seat located directly behind the seat rails at which it is installed when in the riding position. This embodiment thereby allows for interaction between the child and rearwards seated passenger. Since the child seat module is movable along the seat rails the position of the child seat module along the extension of the seat rails is adjustable.

The angular loading position according to the disclosure, in which the seat of the child seat being rotated essentially perpendicular, i.e., 80-100 degrees, with respect to the riding position such as to face the side opening of the vehicle, allows for easy loading and unloading of the child/baby. This is an important benefit of all the embodiments.

Additional features, being comprised in some of the example embodiments, are described hereafter. The additional features are combinable with the embodiment disclosed above, and with each other. Each embodiment may comprise one or several of the additional features.

According to some of the example embodiments the child seat module comprises first locking means for locking the rotation of the child seat around the axis of rotation, and wherein the child seat is lockable in the loading position and in the riding position respectively. This allows for controlled loading, unloading and riding as the child seat is hindered from accidentally rotating between positions.

The first locking means may also be part of the safety system, the first locking means being arranged to prevent the child seat from being rotatable from the riding position to the loading position when the child seat module is installed in a vehicle and the vehicle is moving and/or the engine is on.

According to some of the example embodiments the child seat module is arranged to be movable along the seat rails at least to a front position and a rear position and the rear position is arranged such as to, when the module is arranged in the vehicle, allow a passenger in a seat located directly behind the child seat module to reach into the seat of the child seat when the module is in said rear position. If a child is sitting in the child seat he or she is reachable when in the rear position by the person sitting directly behind and can be stroked, given a bottle, etc. Compared to a conventional child seat arranged in the seat of a passenger seat the handling of the child is much easier due to improved access for the rearward sitting passenger. For example, the passenger can pick up and give back a dropped pacifier thereby contributing to a better experience for the child as well as reducing the distractions for the driver. A suitable distance along the seat rails between the front position and the rear position is about 100-400 mm, i.e., the child seat module is movable along the seat rails about 100-400 mm. The distance is chosen depending on the size of the passenger compartment and the extension of the seat rails. The base is lockable at least in the front and rear position. The movement along the seat rails may be achieved manually or automatically by means of a stepless motor.

According to some of the example embodiments a suitable distance between the seat reference point (SRP) of the passenger seat located directly behind the child seat module and the SRP of the child seat module in its rear position in order to allow a passenger in a seat located directly behind the child seat module to reach into the seat of the child seat may be 700-1000 mm. One specific example of this measurement is 820 mm. The term SRP is known in the industry. SRP is defined as the theoretical hip point used by manufacturers when designing a vehicle and describes the relative location of the seated dummy's hip point. When the child seat module is positioned in its rear position the front edge of the child seat may be located at a distance 200-350 mm from the front edge of the seat located directly behind it. One example of such a suitable distance is 285 mm because it allows a good reach between the back seat passenger and the child. The suitable distances vary with the vehicle model, the size of the passenger compartment, the design of the child seat, etc.

The position of the child seat module may be controlled by means of a remote control. With a remote control is meant for instance a remote control connected with wire directly to the motor, a wireless remote or a touchpad removably or securely attached to a surface of the vehicle. The child seat module is allowed to continuously move over the length of the seat rails.

According to some of the example embodiments the front position is arranged such that the child seat is in line with a side opening of the passenger compartment, and when the module is in its front position and the child seat is in its loading position the seat of the child seat is facing the side opening of the passenger compartment. This facilitates easy loading and unloading of a child into and out of the child seat.

According to some of the example embodiments the front position is arranged such that the base, when installed in the vehicle, is at least partly located beneath the instrument panel in when the child seat module is in the front position.

According to some of the example embodiments the base comprises a storage compartment arranged in the interior of the base and the storage compartment comprises a drawer arranged to be opened towards the back of the passenger compartment when the module is arranged in the vehicle. The base comprises at least four sides; a front arranged to face forward, two sides and a top. It may also comprise a bottom and a back arranged to face rearwards in the passenger compartment when installed in the vehicle. The interior of the base is defined by the at least four sides of the base. The storage compartment may take up part of or the entire interior of the base. The storage compartment is located in between the sides. The drawer may be operated manually, automatically, remotely from the back seat, etc.

The child seat is arranged at the top side of the base. According to some of the example embodiments the child seat is releasably engaged to the base by means of engagement. The child seat is thereby removable as a separate piece, whilst the base may still be arranged in the passenger compartment. The base can be installed in the vehicle without the child seat yet engaged to it.

According to some of the example embodiments at least a front part of the base extends forwards of the child seat and the at least front part of the base comprises a storage surface. The storage surface may be used to support a nursing bag such that the nursing bag does not have to be placed on the floor of the passenger compartment. The supporting surface allows for the space in front of the child seat module to be used.

According to some of the example embodiments the child seat module further comprises a storage unit arranged at least partly between the base and the child seat, the storage unit comprising at least one compartment for storing child necessities, the at least one compartment being arranged on at least one side of the storage unit. An example advantage of the storage unit comprising at least one compartment is that that necessities are located at a reachable distance from the passenger seat located directly behind the child seat module, at least when the child seat module is arranged in its back position. Another example advantage of the storage unit is that it provides good use of the space in the passenger compartment.

The at least one compartment for storing child necessities may extend from the side of the storage unit such as to be located besides the child seat. The storage unit may comprise compartments of the same or different sizes.

The compartments for storing child necessities may also be arranged directly on the child seat, on at least one side of the child seat.

According to some of the example embodiments the storage unit rotates with the child seat around the axis of rotation with respect to the base. The compartment(s) of the storage unit are thereby not in the way when loading/unloading the child into the seat of the child seat.

According to some of the example embodiments the child seat is releasably engaged to both said base and said storage unit. The child seat can thereby be removed while the storage unit and the base remain installed in the passenger compartment.

According to some of the example embodiments not comprising the storage unit the child seat is releasably arranged to the base directly.

According to some of the example embodiments the child seat is movable between an upright and an inclined position in relation to the base and the module comprises second locking means, and the child seat is lockable in the upright position and in the inclined position respectively by means of the second locking means. An example advantage of the upright and the inclined position is improved comfort for the child when in the child seat. The inclined position may for example be useful when the child is sleeping, as it provides a more natural sleeping position. The movement between the two positions may be achieved mechanically or electrically by means of a motor. It may be controlled manually or automatically; for example controlled by a button in the back seat, via the instrument panel, via an app in a mobile phone, a remote control, etc.

According to some of the example embodiments the child seat comprises a rocking function, the rocking function allowing the child seat to continuously move between the upright and the inclined position for rocking the child seat. The child seat module may be provided with means for rocking, arranged at the bottom of the child seat. An example effect of the rocking function is improved comfort for the child. The speed of the continuous movement may be adjustable to improve comfort for the child. The rocking function may be controlled in a similar manner as explained above in conjunction with the movement between the upright position and the inclined position.

According to some of the example embodiments the rocking function is only activatable when the vehicle is not moving and/or the engine is off.

According to some of the example embodiments the child seat comprises a handle pivotably arranged at an upper part of the child seat and pivotable over the top of the child seat. The handle ends are arranged to attach to pivot points at the sides of the child seat, and arranged such that the child seat may be carried in the handle when disengaged from the storage unit and/or base. The handle is pivotable such as to be located either in front, above or behind the upper part of the back rest of the child seat. With the upper part of the child seat the at least upper third of the back rest is meant. The upper part of the back rest of the child seat is arranged to support a child's head. The top of the child seat is defined as the uppermost edge of the child seat back rest.

According to some of the example embodiments the handle comprises a sun shield and the sun shield shields at least the upper part of the child seat when the handle is pivoted over the top of the child seat into a position in which the sun shield is arranged in front of the upper part of the child seat back rest. The sun shield may be of any suitable material shielding at least the head of a child seated in the child seat from sun. The sun shield may be arranged to unfold as the handle is pivoted over the top of the child seat.

According to some of the example embodiments the seat of the child seat is at least partly covered by a microbial material and/or by a material being infused with substances arranged to be released when the material is touched. An example advantage of some of the example embodiments comprising these features are improved health of the child. The substances, e.g., vitamins, minerals, lubricants, released by touch of the infused material may be taken up by inhalation or via the skin. Such materials, used in other technical fields, are known and will not be further discussed. Their release may be controlled depending on the substance and the use.

This disclosure also relate to a vehicle comprising child seat module as described herein. According to some of the example embodiments an additional floor covers the seat rails. This provides an improved visual impact.

BRIEF DESCRIPTION OF THE DRAWINGS

One example embodiment will now be described in detail with reference to the attached figures, wherein:

FIG. 2B shows a side view of an example child seat module of FIG. 2A installed in a two-row vehicle;

FIG. 9 shows a side view of an example child seat module of FIG. 1B installed in a three-row vehicle.

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1A:
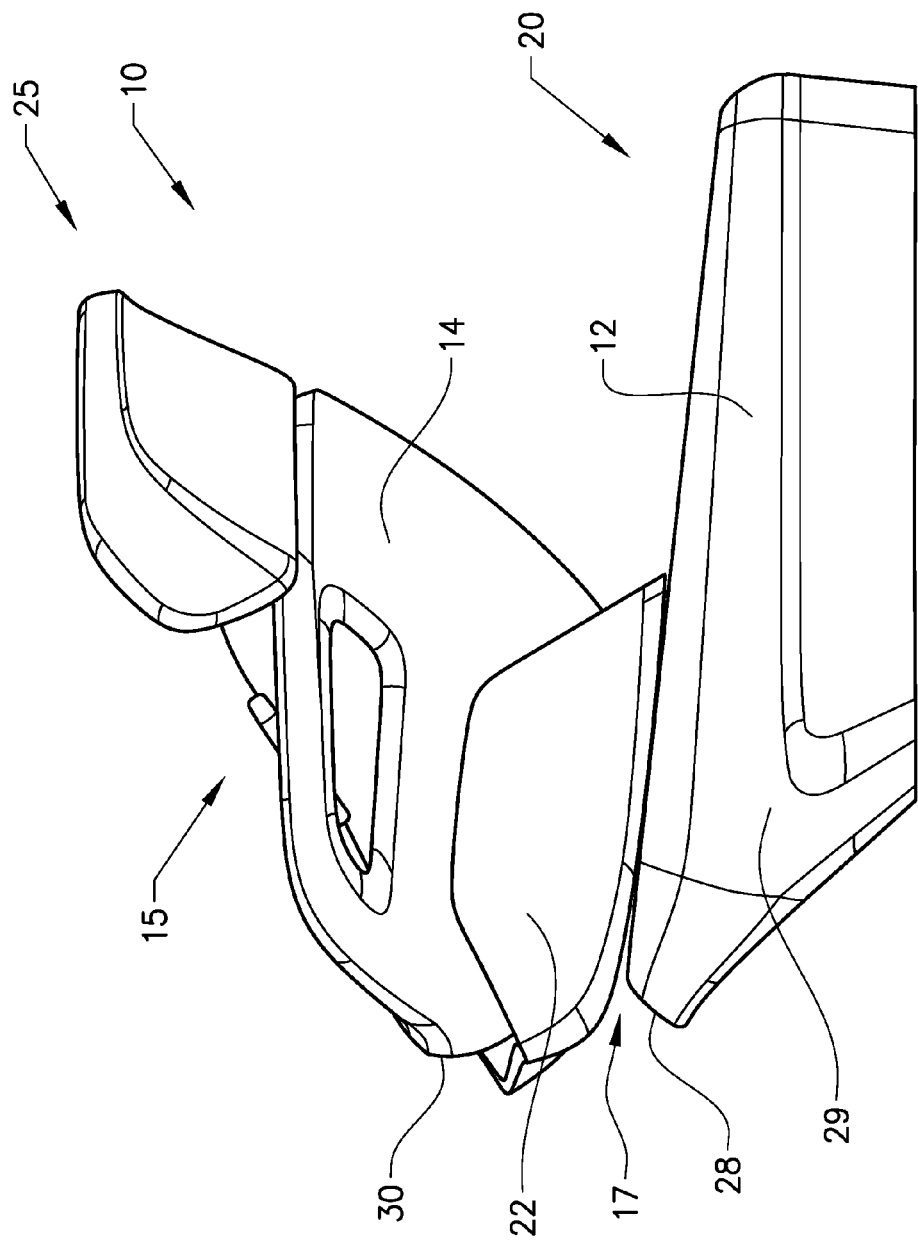
FIG. 1A shows a side view of an example child seat module of the disclosure in a riding position.

FIG. 1A shows an example child seat module 10 in a riding position. In this example, the child seat module 10 comprises a base 12, a storage unit 22 arranged on top of the base 12 and a child seat 14 arranged on top of the storage unit 22. The child seat 14 is arranged in a position such that the seat 15 of the child seat 14 is facing the same direction as the main extension of the base 12, which is also the direction of the extension of seat rails 13 (not shown) at which the child seat module can be arranged. The storage unit 22 and the child seat 14 are arranged off center on the base 12, i.e., arranged towards the edge 28 of the base 12. The front edge 30 of the child seat 14 is arranged vertically in line with the edge 28 of the base. A front part 20 of the base 12 extends forwards of the child seat 14. This particular arrangement provides a surface on top of the base 12 at the front part 20 which may be utilized for storage support.

Figure 1B:
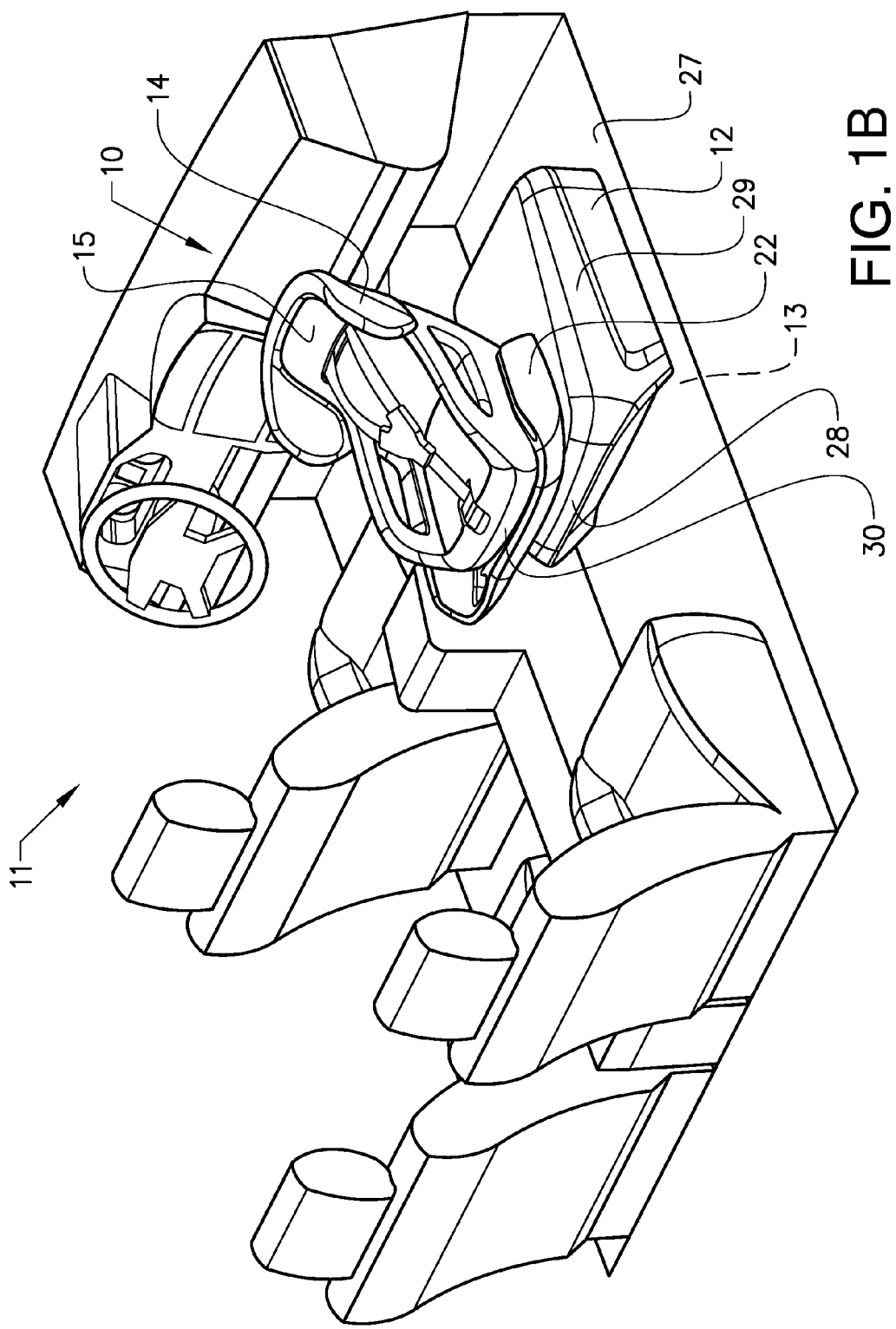
FIG. 1B shows a side view of an example child seat module of FIG. 1A installed in a two-row vehicle.

FIG. 1B shows the child seat module 10 of FIG. 1A installed in the passenger compartment 11 of a vehicle. In this example the front passenger seat has been removed from the vehicle. The child seat module 10 has been installed in its place. The base 12 cooperates with the seat rails 13 located at the floor of the passenger compartment, such that the base 12 is movable along the seat rails 13 (not shown). For example, the base 12 may be fixedly connected via suitable fasteners to two upper seat rails that are each slidably or otherwise movably received on a lower seat rail mounted to the floor, wherein the upper seat rails may be selectively lockable with respect to the lower seat rails (e.g, using a mechanical lock or motor) to lock the base 12 in a desired position along the lower seat rails. In one example the extension of the seat rails are 200 mm; hence the distance between the child seat module's front position and rear position is 200 mm. An additional floor 27 is covering the seat rails 13. The seat 15 of the child seat 14 is facing rearwards towards the back passenger seat located in the row behind the child seat module 10.

Figure 2A:
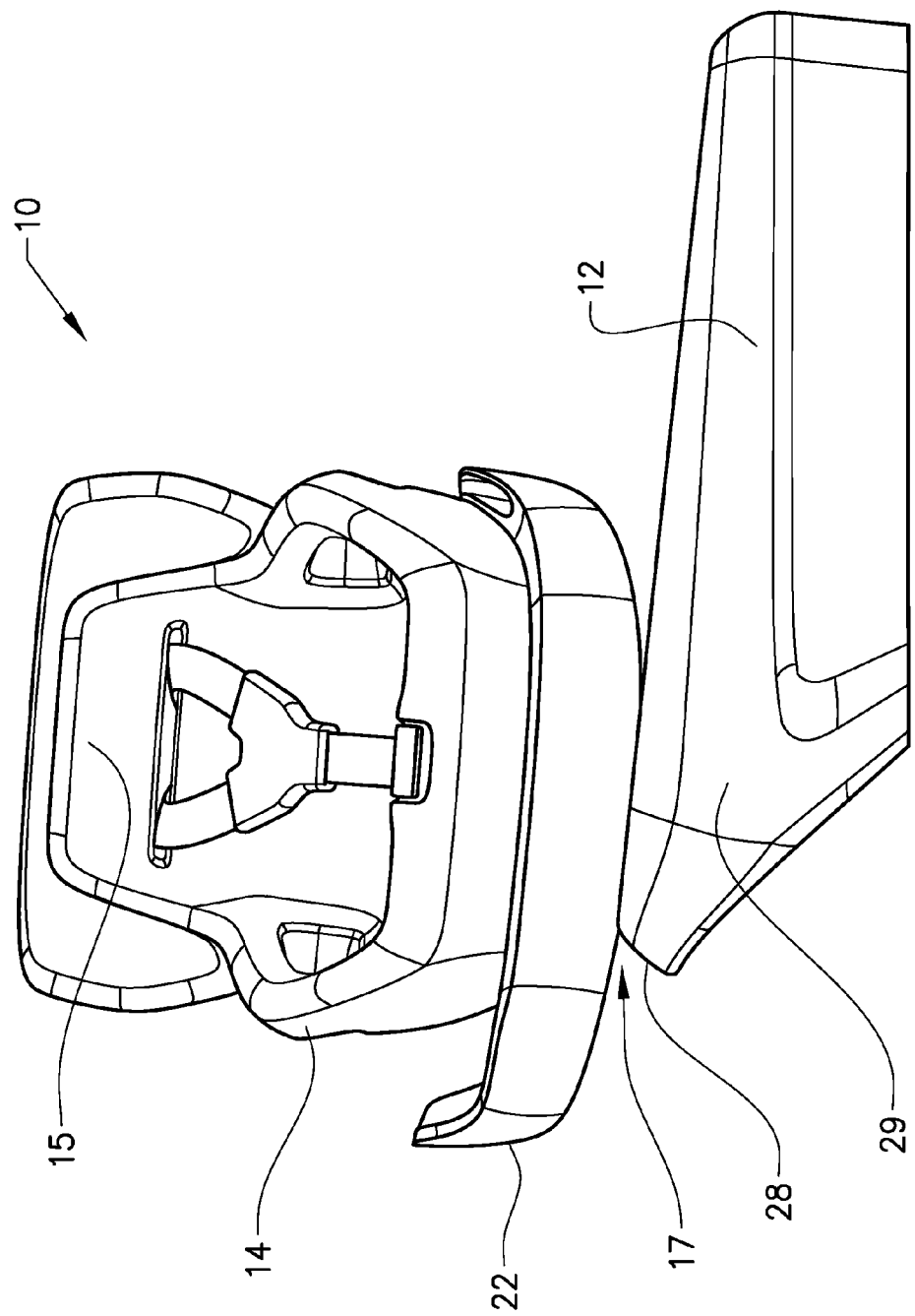
FIG. 2A shows a side view of an example child seat module of the disclosure in a loading position.

FIG. 2A shows the example child seat module 10 in a loading position, wherein the seat 15 of the child seat 14 is facing a direction perpendicular to the main extension of the base 12. For example, the storage unit 22 may be releasably and rotatably mounted on the base 12 such that the storage unit 22 and child seat 14 are rotatable about an axis of rotation between the loading position and the riding position. The base 12 is arranged to be installed along the seat rails 13 of a passenger compartment of a vehicle, and configured to move in the direction of its main extension along the seat rails.

FIG. 2B shows the child seat module 10 of FIG. 2A installed at the position of a removed front passenger seat in a vehicle as described in conjunction with FIG. 1B. The child seat 14 is rotated such, in respect to the base 12 of the child seat module 10, that the seat 15 of the child seat 14 is facing a side 29 of the base 12 and a side opening 16 opposite the driver's side of the vehicle. The seat 15 of the child seat 14 is in this loading position essentially perpendicular to the extension of the seat rails 13 to which the base 12 of the child seat module 10 is releasably connected. The base 13 is movable along the seat rails 13 such as to allow the child seat module 10 to be arranged at a suitable position along the seat rails 13 at which a child can be easily loaded or unloaded from the child seat 14, e.g., a position corresponding to the side opening 16. Since the seat 15 of the child seat 14 is facing the exterior of the vehicle if the door of the side opening 16 is opened, the seat 15 is accessible and no twisting or turning is needed to place the child in the seat 15.

In FIGS. 2A-B the child seat 14 has been allowed to rotate towards the side of the passenger compartment between 80-100 degrees with respect to the base 12 such that the seat 15 of the child seat 14 is facing sideways.

First locking means 17 are arranged to interact between the child seat 14 and the base 12 for locking the rotation of the child seat 14 around the axis of rotation. The first locking means 17 may be any suitable locking means, such as a slidable or pivotable latch, pawl, or pin that is mounted on one of the base 12 and the storage unit 22 and that is selectively engageable with or insertable into one of multiple catches, projections, teeth, grooves, indentations, or openings on the other of the base 12 and the storage unit 22 to lock the storage unit 22 and child seat 14 with respect to the base 12. As another example, the first locking means 17 may include a clamping-type friction brake. Moreover, engagement and/or disengagement of the first locking means 17 may be achieved manually, such as via levers or cables, or automatically, such as by one or more electric solenoids that can be activated remotely. As yet another example, the first locking means 17 may comprise a motor that is configured to automatically rotate the child seat 14 and storage unit 22 with respect to the base 12 and to lock the child seat 14 with respect to the base 12 when a desired position has been reached. Furthermore, the child seat 14 is lockable in the loading position and in the riding position respectively. In one example the vehicle may be non-drivable when the child seat is in the loading position due to safety regulations. In such a configuration the vehicle engine is allowed to be switched into drivable mode only when the child seat is locked in the riding position.

Figure 3:
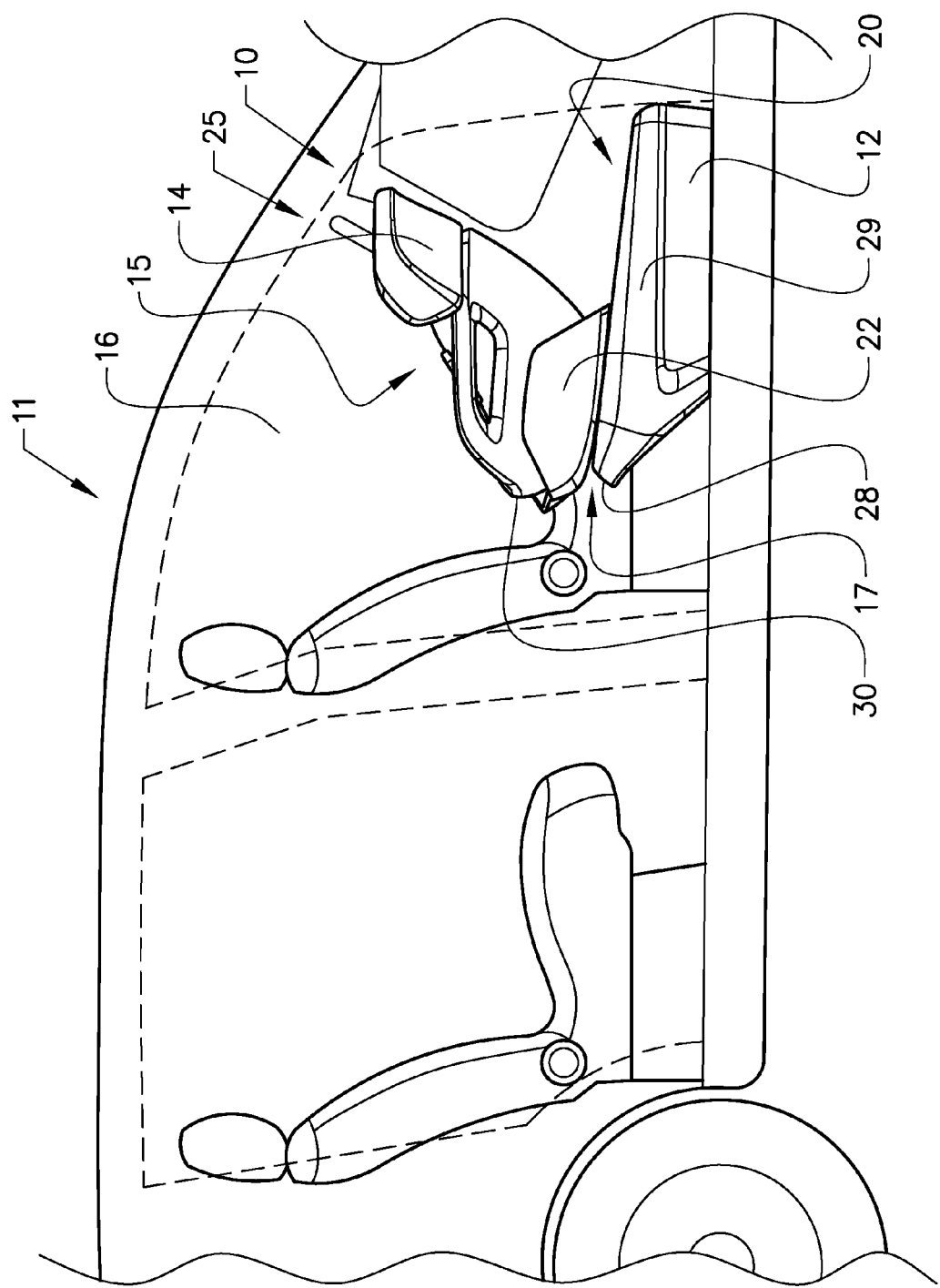
FIG. 3 shows a side view of an example child seat module of FIG. 2 in front position.
Figure 4:
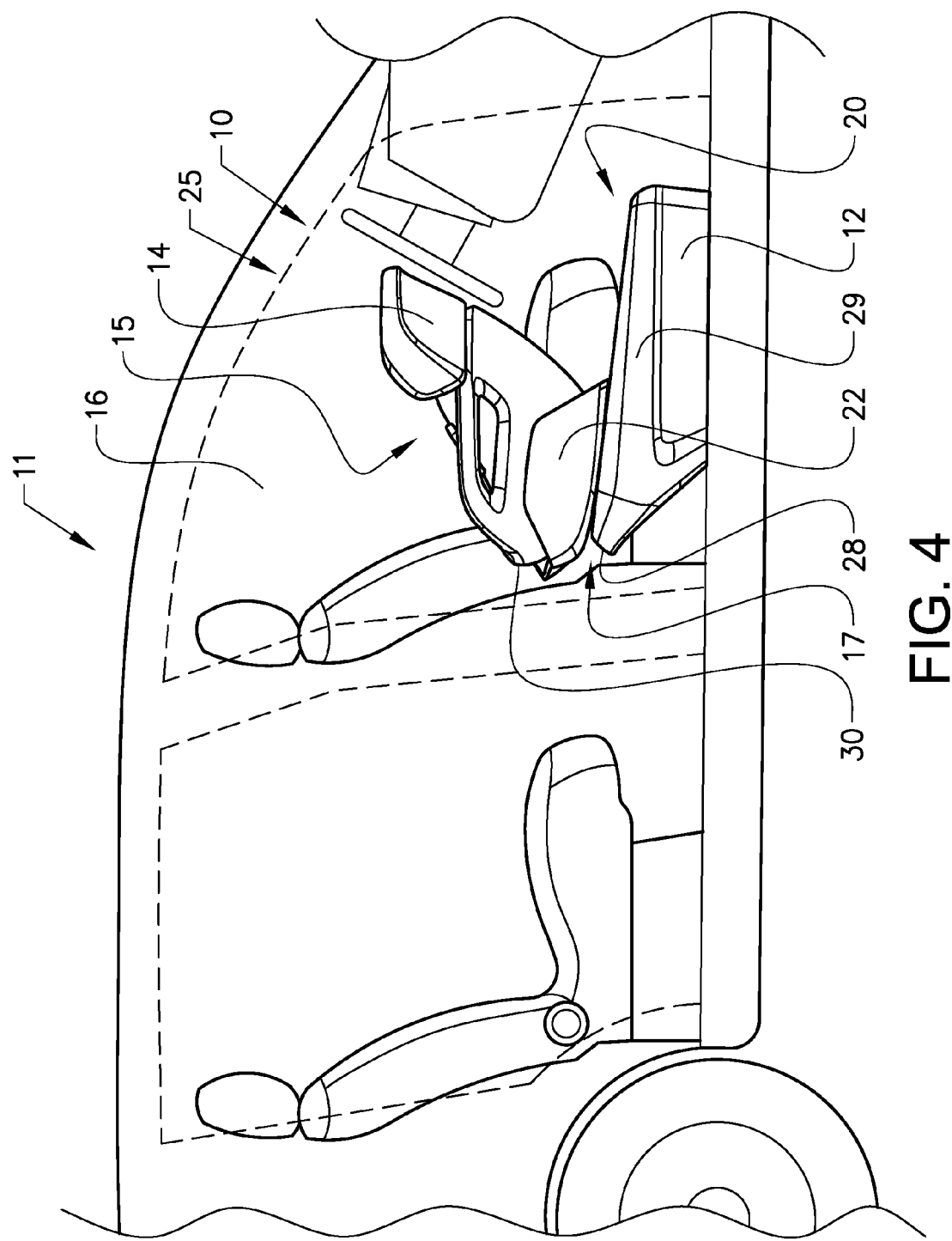
FIG. 4 shows a side view of an example child seat module of FIG. 2 in rear position.

FIG. 3 shows the child seat module 10 in a front position wherein the back of the child seat 14, being in riding position, is located adjacent the instrument panel and the front of the base 12 is located partly underneath the instrument panel. In FIG. 4 the child seat module is in a rear position, i.e., the base 12 has been allowed to move backwards in the passenger compartment along the seat rails 13. The child seat is thus easily accessible from the passenger seat arranged rearwards of the child seat module. In one example the distance between the front edge 30 of the child seat 15 and the front edge of the passenger seat behind it is 285 mm.

Figure 5:
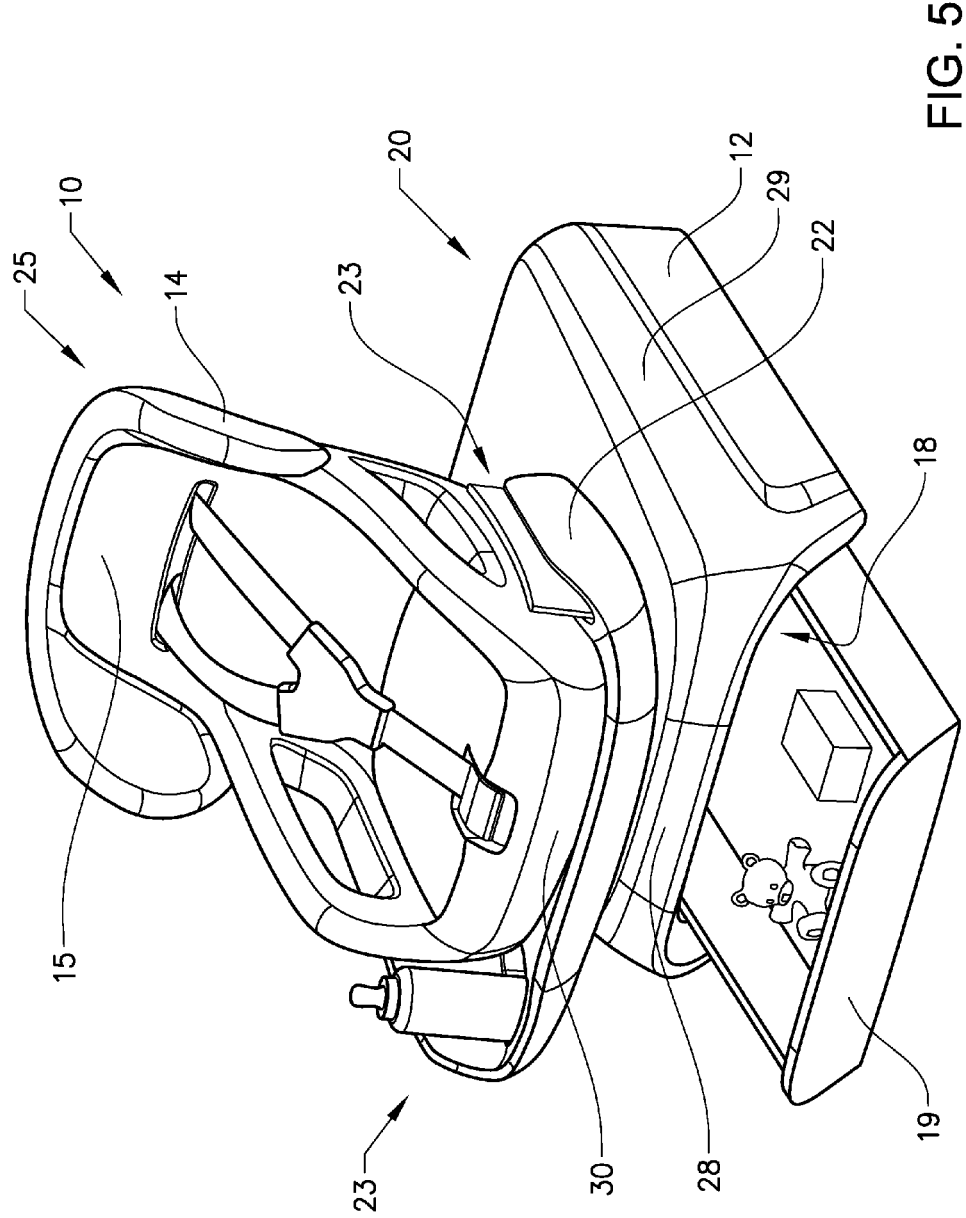
FIG. 5 shows a front view of an example child seat module of the disclosure.

In the example child seat module 10 a storage compartment 18 is arranged in the interior of the base 12. The storage compartment 18 comprises a drawer 19 which is opened towards the back of the passenger compartment 11 in FIG. 5. If the child seat module 10 is installed in the front row of a vehicle the drawer 19 is accessible from the seat behind it in the back seat.

Storage is also available in the storage unit 22 arranged partly between the base 12 and the child seat 14. The storage unit 22 comprises two compartments 23 for storing child necessities, a first compartment 23 being arranged on a first side of the storage unit 22 and a second compartment 23 being arranged on a second side of the storage unit, shown in FIG. 5. The storage compartments 23 extend along the sides of the child seat 14. In this example the first compartment 23, arranged towards the opening of the vehicle and towards the side 29 of the base, is smaller than the second compartment 23, arranged towards the middle of the passenger compartment when the child seat module 10 is installed in a vehicle and arranged in riding position. The compartments 23 are in this example used to store a bottle and nappies. The storage unit 22 rotates essentially perpendicular with the child seat 14 with respect to the base 12 between the loading and the riding position.

Figure 6:
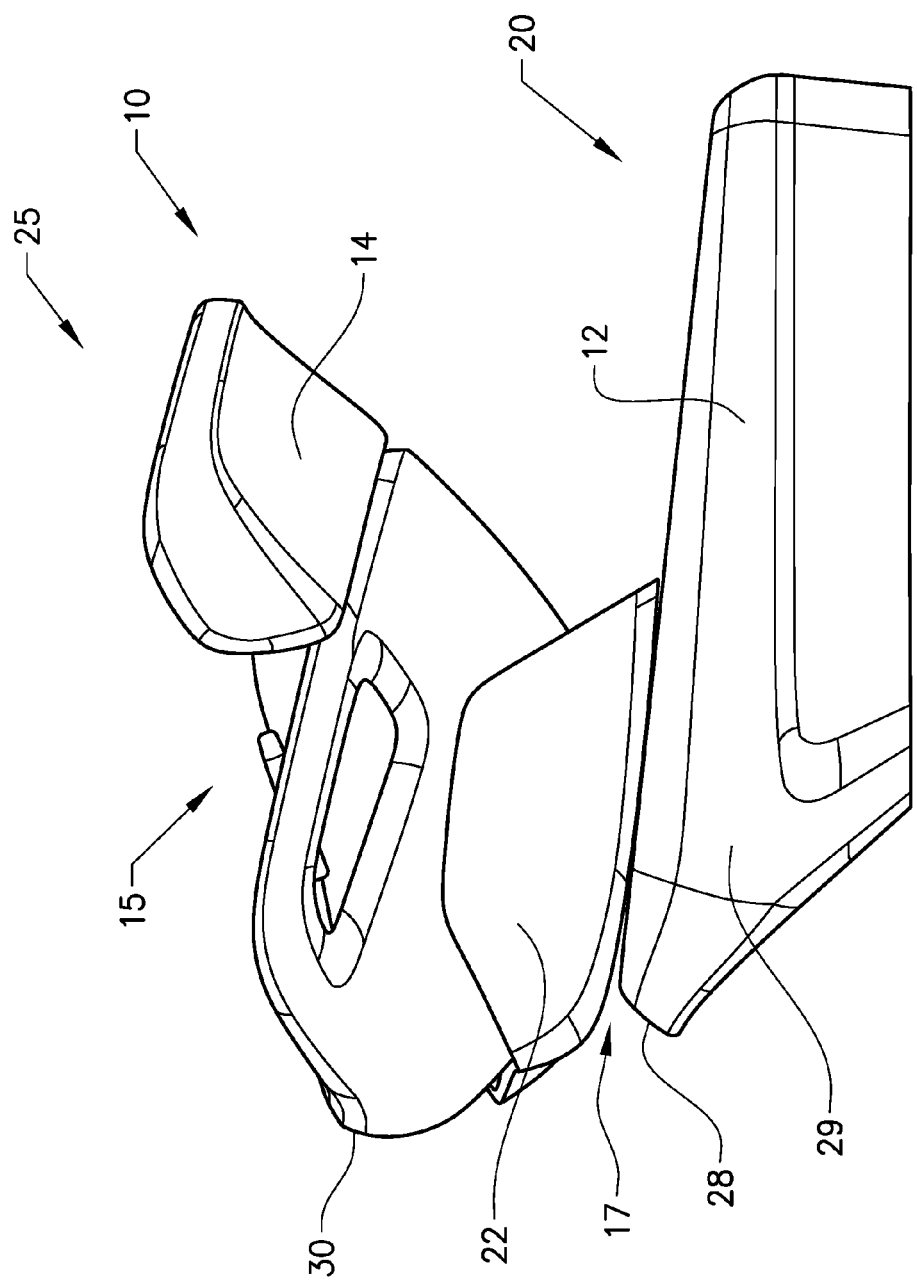
FIG. 6 shows a side view of an example child seat module of the disclosure, the child seat being rocked.

FIG. 6 shows the child seat 14 in an inclined position in relation to the storage unit 22 and the base 12. Second locking means are arranged to lock the child seat 14 in the inclined position. Alternatively, the child seat 14 may rock between the inclined position and the upright position of FIG. 5 by means of a rocking function. For example, the child seat 14 may be releasably attached to the storage unit 22 with one or more (e.g. two) coaxial bearings, such as one bearing on each side of the child seat 14 or each side of the storage unit 22. As another example, the storage unit 22 may include one or more curved rails or tracks on which the child seat 14 is rockably or slidably mounted, such that the child seat 14 is releasable from the one or more curved tracks. The child seat 14 may also include one or more friction reducing devices, such as wheels, rollers, or low friction pads, that are engageable with the one or more tracks to facilitate movement of the child seat 14 with respect to the storage unit 22. Furthermore, the second locking means may be any suitable locking means, such as one or more slidable or pivotable latches, pawls, or pins on the child seat 14 that are each selectively engageable with or insertable into one of multiple catches, projections, teeth, grooves, indentations, or openings on each of the one or more curved tracks or other portion of the storage unit 22 to lock the child seat 14 with respect to the storage unit 22. As another example, the second locking means may include a slidable or pivotable latch, pawl, or pin on each of the one or more curved tracks or other portion of the storage unit 22, and each latch, pawl, or pin may be selectively engageable with or insertable into one of multiple catches, projections, teeth, grooves, indentations, or openings on the child seat 14 to lock the child seat 14 with respect to the storage unit 22. As yet another example, the second locking means may include a clamping-type friction brake. Moreover, engagement and/or disengagement of the second locking means may be achieved manually, such as via levers or cables, or automatically, such as by one or more electric solenoids that can be activated remotely. As yet another example, the second locking means may comprise a motor that is configured to move (e.g., from one position to another, or continuously rock) the child seat 14 with respect to the storage unit 22 and to lock the child seat 14 with respect to the storage unit 22 when a desired position has been reached.

Figure 7:
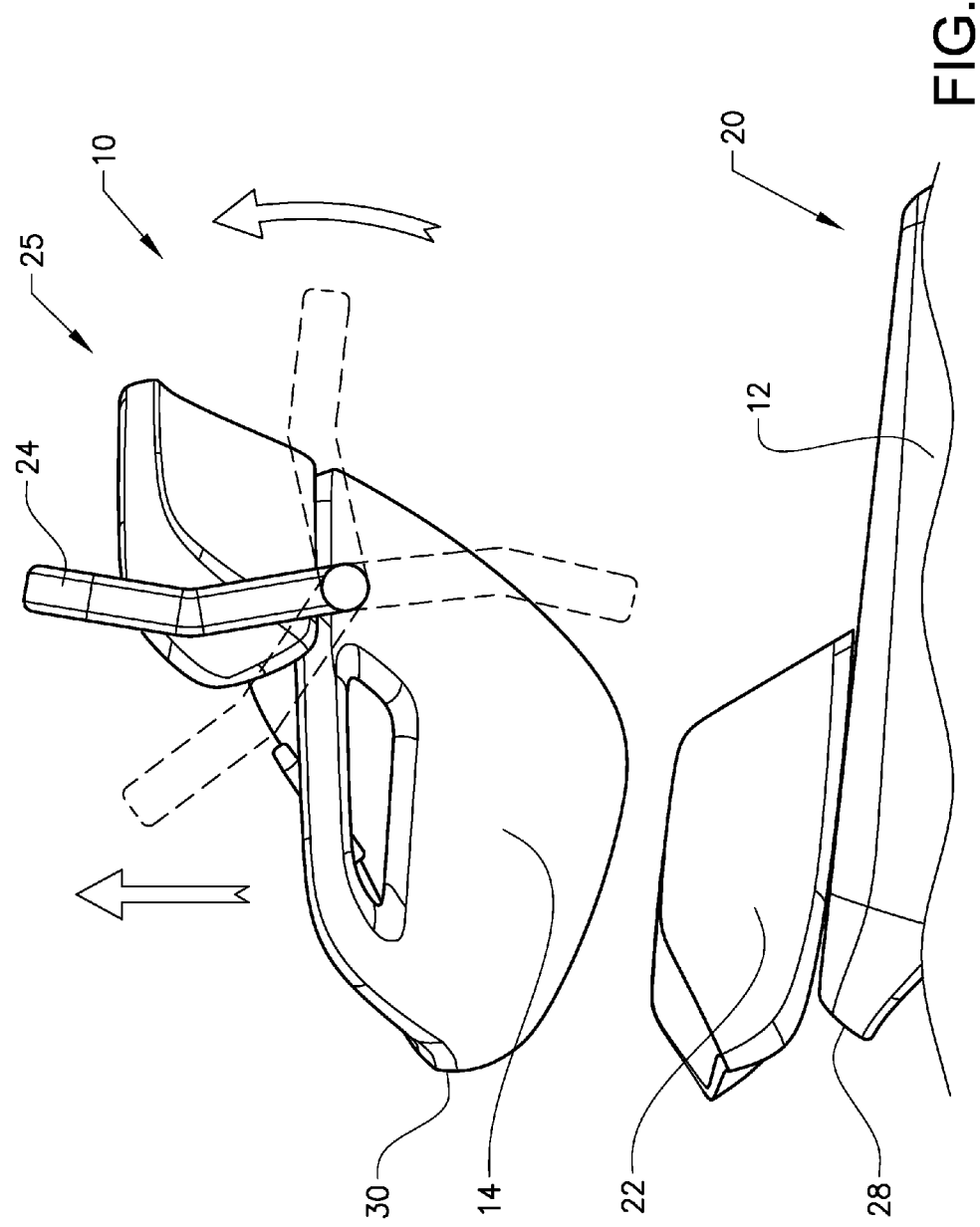
FIG. 7 shows a side view of an example child seat module of the disclosure.

FIG. 7 shows the child seat 14 being provided with a handle 24 pivotally connected to a child seat body of the child seat 14 such that the handle 24 is pivotable over the upper part 25 of the child seat body of the child seat 14. The child seat 14 is disengaged from the base 12 and the storage unit 22. The child seat 14 can be removed and used separately from the base 12 and the storage unit 22.

Figure 8:
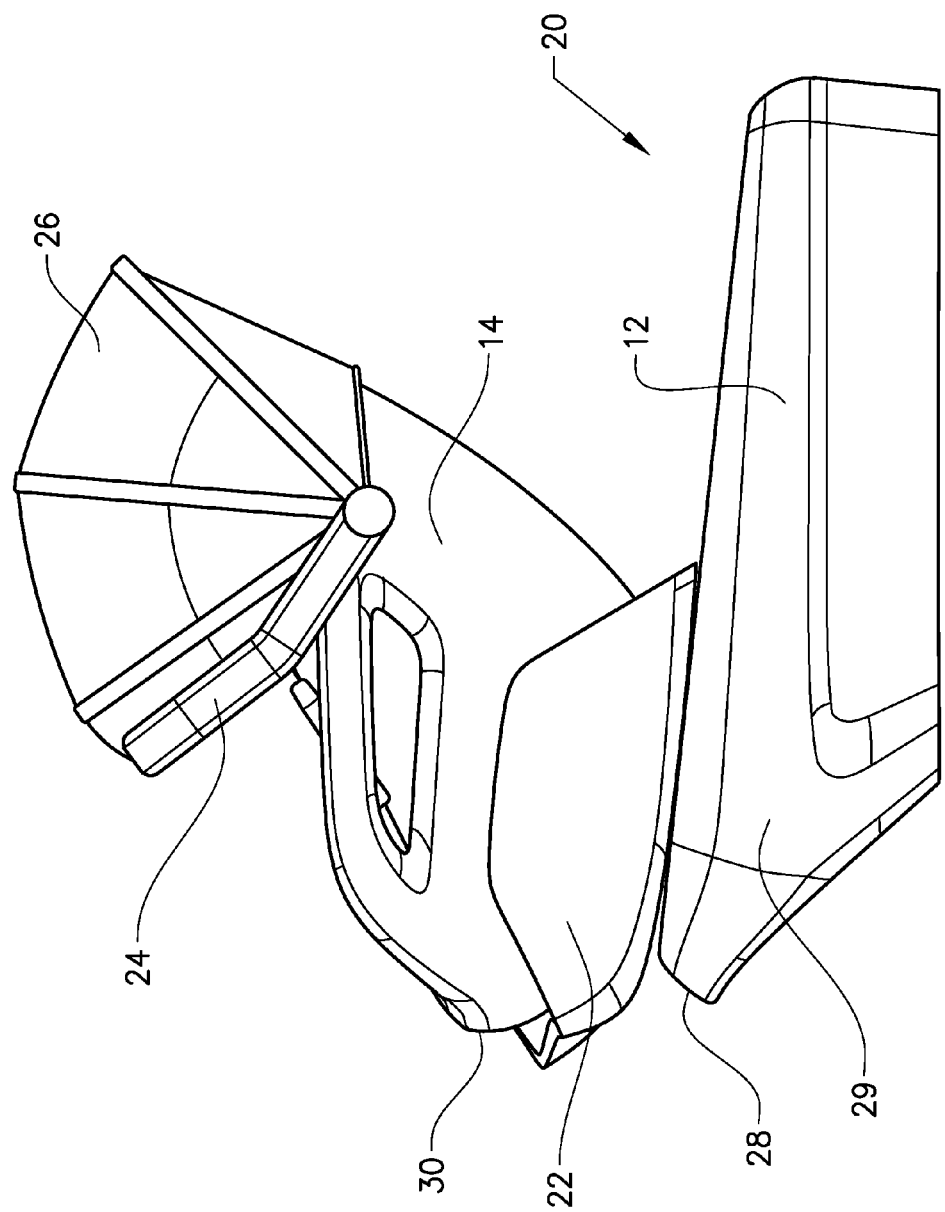
FIG. 8 shows a side view of an example child seat module with the child seat removed.

In FIG. 8 the handle 24 comprises a sun shield 26 which is unfolded to shield the upper part 25 of the child seat 14 when the handle 24 is pivoted over the top of the child seat 14.

FIG. 9 shows the child seat module 10 being installed in the second row of seats, wherein one passenger seat is removed, in a vehicle comprising three rows of seats. In this example, the child seat module 10 is arranged next to a passenger seat instead of next to the driver seat. In this example, the base 12 is not located beneath the instrument panel when the child seat module 10 is in the front position. The front position in this example represent a position wherein the child seat module 10 has been moved along the seat rails 13 as far away from the passenger seat located directly behind the child seat module 10 as possible with respect to the seat rails 13 and the rear position in this example represent a position wherein the child seat module 10 has been moved along the seat rails 13 as much towards the passenger seat located directly behind the child seat module 10 as possible with respect to the seat rails 13. All other aspects of this example are the same as described in conjunction with the examples of FIGS. 1-8.

As will be realized, the disclosure is capable of modification in various obvious respects, all without departing from the scope of the appended claims. For example the storage unit may be omitted from the module and the base may have a different shape, e.g., the base does not have to have an elongated shape. However, these configurations may provide additional storage space which benefits the child seat module and at least part of its purpose. Accordingly, the drawings and the description herein are to be regarded as illustrative in nature, and not restrictive.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A child seat module for arrangement in a passenger compartment of a vehicle, the child seat module comprising:
   a base connectable to seat rails of the passenger compartment;
   a child seat arrangeable on top of the base and comprising a seat, wherein the child seat is rotatable around an axis of rotation with respect to the base between a riding position and a loading position, wherein, when the module is arranged in the vehicle, the seat of the child seat faces rearward toward a back of the passenger compartment when the child seat is in the riding position, and the child seat is rotated between 80-100 degrees with respect to the base such that the seat of the child seat faces toward a side opening of the passenger compartment when the child seat is in the loading position; and
   a storage unit arranged at least partly between the base and the child seat when the child seat is arranged on the base, the storage unit comprising at least one compartment on at least one side of the storage unit, wherein the storage unit is rotatable with the child seat around the axis of rotation with respect to the base.

2. The child seat module according to claim 1 further comprising first locking means for locking the rotation of the child seat around the axis of rotation, and wherein the child seat is lockable in the loading position and in the riding position respectively.

3. The child seat module according to claim 1 wherein the child seat module is configured to be movable along the seat rails at least to a front position and a rear position, and wherein the rear position is arranged such as to, when the child seat module is arranged in the vehicle, allow a passenger in a seat located directly behind the child seat module to reach into the seat of the child seat when the child seat module is in the rear position.

4. The child seat module according to claim 1 wherein the base comprises a storage compartment arranged in an interior of the base, and wherein the storage compartment comprises a drawer arranged to be opened toward the back of the passenger compartment when the child seat module is arranged in the vehicle.

5. The child seat module according to claim 1 wherein at least a front part of the base extends forward of the child seat when the child seat is arranged on the base, and wherein the at least front part of the base comprises a storage surface.

6. The child seat module according to claim 1 wherein the at least one compartment of the storage unit is configured for storing child necessities.

7. The child seat module according to claim 1 wherein the child seat is releasably connectable with both the base and the storage unit.

8. The child seat module according to claim 1 wherein the child seat is movable between an upright position and an inclined position in relation to the base, and the child seat module comprises second locking means for locking the child seat in the upright position and in the inclined position respectively.

9. The child seat module according to claim 8 wherein the child seat comprises a rocking function, the rocking function allowing the child seat to continuously move between the upright position and the inclined position for rocking the child seat.

10. The child seat module according to claim 1 wherein the child seat comprises a child seat body and a handle pivotably arranged at an upper part of the child seat body and pivotable over a top of the child seat body.

11. The child seat module according to claim 10 wherein the handle comprises a sun shield, and the sun shield shields at least the upper part of the child seat body when the handle is pivoted over the top of the child seat body.

12. The child seat module according to claim 1 wherein the seat of the child seat is at least partly covered by a microbial material and/or by a material being infused with substances that are releaseable when the material is touched.

13. A vehicle comprising the child seat module according to claim 1.

14. The vehicle according to claim 13 further comprising a floor at which the seat rails are located, and an additional floor that covers the seat rails.

15. The child seat module according to claim 1 wherein a front part of the base extends forward of the child seat and below the child seat when the child seat is arranged on the base, and wherein the front part of the base comprises a storage surface.

16. The child seat module according to claim 1 wherein a front part of the base extends forward of the child seat when the child seat is arranged on the base and positioned in the riding position, and wherein the front part of the base comprises a storage surface.

17. The child seat according to claim 1 wherein the base is releasably connectable to the seat rails of the passenger compartment such that the base is movable along the seat rails.

18. A child seat module for arrangement in a passenger compartment of a vehicle, the child seat module comprising:
   a base connectable to seat rails of the passenger compartment;
   a child seat arrangeable on top of the base and comprising a seat, wherein the child seat is rotatable around an axis of rotation with respect to the base between a riding position and a loading position, wherein, when the module is arranged in the vehicle, the seat of the child seat faces rearward toward a back of the passenger compartment when the child seat is in the riding position, and the child seat faces toward a side opening of the passenger compartment when the child seat is in the loading position; and
   a storage unit arranged at least partly between the base and the child seat when the child seat is arranged on the base, the storage unit comprising at least one storage compartment, wherein the storage unit is rotatable with the child seat around the axis of rotation with respect to the base.

19. The child seat according to claim 18 wherein the base is releasably connectable to the seat rails of the passenger compartment such that the base is movable along the seat rails.

20. A child seat module for arrangement in a passenger compartment of a vehicle, the child seat module comprising:
   a base connectable to seat rails of the passenger compartment;
   a child seat arrangeable on top of the base and comprising a seat, wherein the child seat is rotatable around an axis of rotation with respect to the base between a riding position and a loading position, wherein, when the module is arranged in the vehicle, the seat of the child seat faces rearward toward a back of the passenger compartment when the child seat is in the riding position, and the child seat faces toward a side opening of the passenger compartment when the child seat is in the loading position; and
   a storage unit arranged at least partly between the base and the child seat when the child seat is arranged on the base, the storage unit comprising at least one storage compartment;
   wherein the child seat is releasably attachable to the storage unit, and the storage unit is releasably attachable to the base.

21. The child seat module according to claim 20 wherein the storage unit is rotatable with the child seat around the axis of rotation with respect to the base.

22. The child seat according to claim 20 wherein the base is releasably connectable to the seat rails of the passenger compartment such that the base is movable along the seat rails.

* * * * *